United States Patent [19]

Molloy

[11] 3,919,316

[45] Nov. 11, 1975

[54] 2-AMINODICHLOROTETRALINS

[75] Inventor: Bryan B. Molloy, Indianapolis, Ind.

[73] Assignee: Eli Lilly and Company, Indianapolis, Ind.

[22] Filed: Aug. 5, 1974

[21] Appl. No.: 494,804

[52] U.S. Cl. ............... 260/578; 260/999; 424/330
[51] Int. Cl.$^2$ ..................................... C07C 87/02
[58] Field of Search .................................. 260/578

[56] References Cited
UNITED STATES PATENTS

| | | | |
|---|---|---|---|
| 3,354,200 | 11/1967 | Huebner | 260/578 |
| 3,637,740 | 1/1972 | Sarges | 260/578 |
| 3,704,323 | 11/1972 | Krapcho | 260/578 |

OTHER PUBLICATIONS

Cuiban et al., Chem. Abstracts 1964 (61) Col. 5578c

*Primary Examiner*—Arthur P. Demers
*Attorney, Agent, or Firm*—James L. Rowe; Everet F. Smith

[57] ABSTRACT

5,6-Dichloro-2-aminotetralin or 6,7-dichloro-2-aminotetraline having activity as inhibitors of various enzyme systems.

4 Claims, No Drawings

2-AMINODICHLOROTETRALINS

BACKGROUND OF THE INVENTION

6-Chloro-2-aminotetralin, disclosed in German patent application (Offenlegungsschrift) No. 1,919,082, see *Chem. Abstr.*, 72, P66702Y (1970), is considered to be a rigid conformational analog of 4-chloroamphetamine. This aminochlorotetralin, as well as the 5-chloro and the 7-chloroaminotetralins, behaves similarly to 4- and 3-chloroamphetamine in significantly reducing 5-hydroxytryptamine and 5-hydroxyindoleacetic acid levels in rat brains during the first 6 hours after drug administration. 6-Chloro-2-aminotetralin is somewhat less potent in this regard than 4-chloroamphetamine. Structure activity relationships among the other monochlorinated 2-aminotetralins resemble those among their chloroamphetamine analogs. Dichloro-2-aminotetralins have not previously been prepared.

SUMMARY OF THE INVENTION

This invention provides 2-amino-dichlorotetralins of the formula

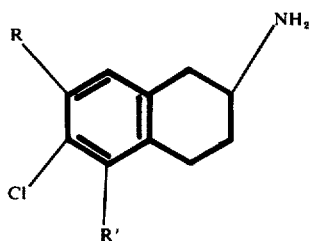

in which one of R and R' is hydrogen and the other is chlorine. Compounds represented by the above formula thus include 2-amino-5,6-dichlorotetralin and 2-amino-6,7-dichlorotetralin. Also included within the scope of this invention are pharmaceutically acceptable acid addition salts of the above amine bases formed with nontoxic acids. These pharmaceutically acceptable salts include salts derived from inorganic acids such as: hydrochloric acid, nitric acid, phosphoric acid, sulfuric acid, hydrobromic acid, hydriodic acid, nitrous acid, phosphorous acid and the like, as well as salts derived from non-toxic organic acids such as aliphatic mono and dicarboxylic acids, phenyl-substituted alkanoic acids, hydroxy alkanoic and alkandioic acids, aromatic acids, aliphatic and aromatic sulfonic acids, etc. Such pharmaceutically acceptable salts thus include sulfate, pyrosulfate, bisulfate, sulfite, bisulfite, nitrate, phosphate, monohydrogenphosphate, dihydrogenphosphate, metaphosphate, pyrophosphate, chloride, bromide, iodide, fluoride, acetate, propionate, decanoate, caprylate, acrylate, formate, isobutyrate, caprate, heptanoate, propiolate, oxalate, malonate, succinate, suberate, sebacate, furmarate, maleate, mandelate, butyne-1,4-dioate, hexyne-1,6-dioate, benzoate, chlorobenzoate, methylbenzoate, dinitrobenzoate, hydroxybenzoate, methoxybenzoate, phthalate, terephthalate, benzenesulfonates, toluenesulfonate, chlorobenzenesulfonate, xylenesulfonate, phenylacetate, phenylpropionate, phenylbutyrate, citrate, lactate, β-hydroxybutyrate, glycollate, malate, tartrate, methanesulfonate, propanesulfonate, naphthalene-1-sulfonate, naphthalene-2-sulfonate and the like salts.

The compounds of this invention are prepared according to the following general procedure. A β-dichlorophenylpropionic acid is used as the starting material. The propionic acid in turn is prepared either by the hydrogenation of the corresponding acrylic acid or by a cyanoacetic or malonic ester synthesis in which a dichlorobenzylbromide is the alkylating agent. Hydrolysis followed by decarboxylation of the resulting dibasic acid yields the propionic acid directly. The β-dichlorophenylpropionic acid is then reduced by diborane or lithium aluminum hydride or other suitable metal hydride reducing agent to the corresponding β-dichlorophenylpropanol. Formation of the mesylate ester (or other reactive ester) of the propanol followed by nucleophilic displacement of the ester group with a cyanide radical yields the corresponding α-dichlorophenylbutyronitrile which is then hydrolysed to the butyric acid. Ring closure of the acid yields directly a dichloro-α-tetralone. The α-tetralone is in turn reduced to an α-tetralol, dehydration of which yields a 3,4-dihydronaphthalene. Epoxidation of the 1,2-ethylenic group followed by rearrangement of the epoxide in the presence of boron trifluoride yields directly the dichloro-β-tetralone. Reductive amination of the β-tetralone with a mixture of sodium cyanoborohydride and ammonium acetate produces the desired 2-aminodichlorotetralin.

Compounds represented by Formula I above either in the form of a free base or as a pharmaceutically acceptable acid addition salt thereof have demonstrated activity as inhibitors of various enzyme systems. For example, 5,6-dichloro-2-aminotetralin and 5,6-dichloro-2-aminotetralin both inhibit rat brain mitochondrial monoamine oxidase in vitro. The compounds are also inhibitors of PNMT (phenethanolamine N-methyl transferase— Axelrod, J., *J. Biol. Chem.*, 237, 1657 [1962]). The compounds demonstrate this activity at concentrations from $10^{-4}$ M down to $3 \times 10^{-7}$ M, with inhibition being practically complete at the higher concentrations. In addition, 5,6-dichloro-2-aminotetralin has the ability to increase 5-hydroxypryptamine concentration in rat brain while depleting the 5-hydroxyindoleacetic acid level. 6,7-dichloro-2-aminotetralin also depletes the 5-hydroxyindoleacetic acid level in the rat brain but has substantially no effect on the 5-hydroxytryptamine concentration.

Compounds which are capable of inhibiting PNMT, since they inhibit the conversion of norephinephrine to ephinephrine, are capable of lowering a high ephinephrine-norephinephrine ratio, a physiological condition which is frequently associated with essential hypertension. The compounds are thus capable of ameliorating the ephinephrine-norephinephrine imbalance in essential hypertension, an important aspect in the treatment of this disease state.

This invention is further illustrated by the following specific examples.

EXAMPLE 1

Preparation of 2-Amino-5,6-dichlorotetralin

A reaction mixture containing 200 g. of 2,3-dichlorotoluene, 242 g. of N-bromosuccinimide, 0.6 g. of benzoyl peroxide and 400 ml. of carbon tetrachloride was stirred overnight while being heated to refluxing temperature. The reaction mixture was then cooled, and filtered to remove succinimide. The filter cake was washed with carbon tetrachloride. The combined filtrate and wash was washed in turn with 1 l. of water and then dried. Evaporation of the carbon tetrachloride yielded a red oil comprising 2,3-dichlorobenzylbromide. An NMR spectrum of the product indicated that it containged about 10 percent unreacted 2,3-dichlorotoluene, but since this starting material did not react in the next step of the procedure, further purification was not undertaken.

A suspension of 89.3 g. of sodium hydride in a mixture of 770 ml. of benzene and 2300 ml. of dimethylformamide (DMF) was prepared under a nitrogen atmosphere. Next, a solution of 554.4 g. of ethyl cyanoacetate in 770 ml. of benzene was added in dropwise fashion while maintaining the temperature below about 25°C. After the addition had been completed, the reaction mixture was stirred for an additional 2 hours at ambient temperature, thus forming the sodium salt of ethyl cyanoacetate. Next a solution of 602 g. of 2,3-dichlorobenzylbromide in 770 ml. of benzene was added in dropwise fashion to the solution containing the sodium salt of ethyl cyanoacetate. The temperature of the reaction was maintained below about 25°C. during the addition, and the reaction mixture was then stirred, still under a nitrogen atmosphere, at ambient temperature for about 72 hours. 50 ml. of ethanol were added in dropwise fashion to destroy any excess sodium hydride present. The reaction mixture was then poured into 7 l. of cold water. The organic layer was separated, and the aqueous layer extracted twice with 2 l. of benzene. The organic layer and extracts were combined and washed with 2 l. of water followed by 2 l. of saturated aqueous sodium chloride. The organic layer was dried, and the solvents evaporated in vacuo, leaving as a residue a dark oil which partially solidified. Distillation of the oil yielded ethyl 3-(2,3-dichlorophenyl)-2-cyanopropionate which boiled in the range 162°–4°C. at 0.3 mm/Hg. The distillate solidified upon standing. Recrystallization of the solid from hexane yielded a crystalline material melting in the range 41°–45°C.

Analysis Calc. for $C_{12}H_{11}Cl_2NO_2$: C, 52.96; H, 4.07; N, 5.15; Cl, 26.06; Found: C, 53.16; H, 4.04; N, 5.27; Cl, 25.81.

A reaction mixture containing 271.3 g. of ethyl 3-(2,3-dichlorophenyl)-2-cyanopropionate, 1350 ml. of dioxane, 450 ml. of 12 N aqueous hydrochloric acid and 450 ml. of water was heated to refluxing temperature with stirring for about 65 hours. The reaction mixture was cooled and diluted with 3 l. of water. The aqueous mixture was extracted with two 2 l. portions of ether. The ether extracts were separated, combined and the combined extracts washed first with water and then with saturated aqueous sodium chloride. The ether solution was dried, and the ether evaporated therefrom, leaving a viscous oily residue comprising 3-(2,3-dichlorophenyl)propionic acid formed in the above hydrolysis and decarboxylation. The viscous oil was dissolved in ether, and the ether solution extracted several times with dilute aqueous sodium hydroxide. The alkaline extracts were combined and acidified with 12 N aqueous hydrochloric acid. 3-(2,3-dichlorophenyl)propionic acid, being insoluble in the acidic solution, separated and was extracted into ether. The ether layer was separated and dried. Evaporation of the ether therefrom yielded solid 3-(2,3-dichlorophenyl)propionic acid which melted at 102°–108°C. after recrystallization from benzene.

Analysis Calc. for $C_9H_nO_2Cl_2$: C, 49.35; H, 3.68; Cl, 32.37 Found: C, 49.63; H, 3.58; Cl, 32.17.

Ninety-five grams of 3-(2,3-dichlorophenyl)propionic acid were dissolved in 500 ml. of tetrahydrofuran (THF), and the solution added in dropwise fashion to 1000 ml. of a 1 M $BH_3$ solution in THF at 0°–5°C. After the addition had been completed, the reaction mixture was refluxed for about 6 hours. Excess $BH_3$ was destroyed by the addition of 2 N aqueous hydrochloric acid. The THF was removed by evaporation in vacuo and the resulting aqueous layer extracted with ether. The ether extract was separated and washed with 10 percent sodium carbonate solution followed by a wash with saturated aqueous sodium chloride. The ether layer was dried, and the ether removed therefrom by evaporation. The residue, comprising 3-(2,3-dichlorophenyl)propanol, had an NMR spectrum consistent with the postulated structure and was used without further purification.

Seventy grams of 3-(2,3-dichlorophenyl)propanol were dissolved in 250 ml. of anhydrous pyridine, and the solution cooled to about 0°C. 45 g. (30 ml.) of methanesulfonyl chloride were added in dropwise fashion while maintaining the temperature below about 15°C. After the addition had been completed, the reaction mixture was allowed to come to ambient temperature, at which temperature it was stirred for about 3 hours. The reaction mixture was then poured into 250 ml. of 12 N aqueous hydrochloric acid and an equal volume of ice. The aqueous mixture was extracted with ether, and the ether extract separated. The ether extract was washed first with 10 percent aqueous sodium carbonate and then with saturated aqueous sodium chloride. Evaporation of the ether yielded 3-(2,3-dichlorophenyl)propanyl mesylate. The mesyl ester was subjected to the next reaction without further treatment. 88 g. of the mesylate were dissolved in 300 ml. of DMF and 75 ml. of water. The solution was cooled to about 0°C. About 30 g. of potassium cyanide were added in portions, and the resulting mixture stirred at ambient temperature for about 40 hours. The reaction mixture was then diluted with 2 l. of water. The aqueous layer was extracted with ether, and the ether extract separated and washed successively with water and saturated aqueous sodium chloride. Evaporation of the ether yielded 69.5 g. of an orange liquid comprising α-(2,3-dichlorophenyl)butyronitrile boiling in the range 108°–115°C. at 0.1 mm/Hg.

Analysis Calc: C, 56.10; H, 4.24; N, 6.54; Cl, 33.12 Found: C, 55.82; H, 4.26; N, 6.28; Cl, 33.30

About 55 g. of α-(2,3-dichlorophenyl)butyronitrile were heated to refluxing temperature in a mixture of 600 ml. of dioxane and 400 ml. of 6 N hydrochloric acid. The hydrolysis mixture was cooled, and the bulk of the dioxane removed by evaporation in vacuo. An additional 500 ml. of water were added, and the resulting aqueous layer extracted with two 500 ml. portions of ether. The ether extracts were separated and combined. The combined extracts were washed with water followed by a wash with saturated aqueous sodium chloride. Evaporation of the ether yielded an oil comprising α-(2,3-dichlorophenyl)butyric acid. The solid was recrystallized from a 1:1 hexanecyclohexane and melted at 102°–105°C.

Analysis Calc.: C, 51.50; H, 4.25; Cl, 30.47 Found: C, 50.99; H, 4.26; Cl, 30.21

A reaction mixture containing 94 g. of α-(2,3-dichlorophenyl)butyric acid and 50 ml. of polyphosphoric acid was heated at 100°C. for about 3.5 hours. The reaction mixture was poured over ice, and the resulting acidic aqueous layer extracted with ethyl acetate. The ethyl acetate layer was separated and washed with water, 10 percent aqueous sodium carbonate and finally saturated aqueous sodium chloride. Evaporation of the ethyl acetate yielded 1-oxo-5,6-dichlorotetralin formed in the above reaction as a solid yellow residue, recrystallization of which from 95 percent ethanol yielded crystals melting at 89°–92°C.

Analysis Calc.: C, 55.84; H, 3.75; Cl, 32.97 Found: C, 55.84; H, 3.55; Cl, 32.78

A solution containing 5.7 g. of sodium borohydride in 250 ml. of anhydrous ethanol was maintained at about 20°C. 21.5 g. of 1-oxo-5,6-dichlorotetralin was added in portions to the borohydride solution while maintaining the temperature below about 20°C. After the addition had been completed, the reaction mixture was stirred for an additional 18 hours after which time the excess sodium borohydride present was decomposed by the addition of an excess of 2 N hydrochloric acid. The bulk of the ethanol was removed by evaporation in vacuo, and the residual aqueous layer extracted with ether. The ether extract was separated and washed with 10 percent aqueous sodium carbonate followed by saturated aqueous sodium chloride. Evaporation of the ether yielded 1-hydroxy-5,6-dichlorotetralin formed in the above reduction. The compound was used without further purification as follows: 23 g. of the hydroxy compound were heated to refluxing temperature in 500 ml. of benzene containing 1 g. of p-toluenesulfonic acid for about 4 hours. During this reaction, water from dehydration of the hydroxy tetraline was collected in a Dean-Stark apparatus. After the theoretical quantity of water had been collected, the dehydration mixture was cooled and washed twice with 10 percent aqueous sodium carbonate, followed by saturated aqueous sodium chloride. The organic layer was dried, and the benzene removed therefrom by evaporation, leaving as a residue 22 g. of a yellow liquid comprising, 1,2-dihydro-5,6-dichloronaphthalene. The compound was used without further purification as follows: 22 g. of the dihydronaphthalene were dissolved in 100 ml. of chloroform, and the chloroform solution added in dropwise fashion to a solution of 21.56 g. of m-chloroperbenzoic acid in chloroform. After the addition had been completed, the reaction mixture was stirred at ambient temperature for about 16 hours. The chloroform solution was then washed successively with 10 percent aqueous sodium carbonate (twice) and saturated aqueous sodium chloride. Evaporation of the chloroform in vacuo left a yellow liquid residue comprising 1,2-epoxy-5,6-dichlorotetralin formed in the above reaction. The compound was used without further purification in the following reaction: 23 g. of the epoxide were dissolved in 250 ml. of benzene, and the resulting solution cooled to a temperature in the range 0°–5°C. The solution was then saturated with anhydrous $BF_3$. The reaction mixture was stirred at ambient temperature for about 1 hour after which time saturated aqueous sodium chloride was added, and the benzene layer was separated. The separated benzene layer was washed with 10 percent aqueous sodium carbonate and then with saturated aqueous sodium chloride. Evaporation of the benzene therefrom yielded a reddish, partially solid oil comprising 2-oxo-5,6-dichlorotetralin. The compound was used without further purification. About 10.8 g. of 2-oxo-5,6-dichlorotetralin were mixed with 2.705 g. of sodium cyanoborohydride, 38.5 g. of ammonium acetate, 400 ml. of methanol and 100 ml. of ethylene dichloride. The resulting mixture was stirred for 2½ days at ambient temperature after which time the pH of the reaction mixture was adjusted to less than 2 by the addition of 12 N hydrochloric acid. The organic solvents were evaporated, and the aqueous layer diluted with water. The aqueous layer was then extracted with ethyl acetate. The ethyl acetate extract was discarded. The aqueous layer containing suspended solids was made basic with 5 N aqueous sodium hydroxide. The resulting basic layer was extracted with ether. The ether extracts were separated, washed with saturated sodium chloride solution and dried. Evaporation of the ether yielded 4.81 g. of 2-amino-5,6-dichlorotetralin formed in the above reaction.

The maleate salt was prepared in isopropanol and methanol. Methanol-insoluble material was separated by filtration, and the filtrate cooled. 2-Amino-5,6-dichlorotetralin maleate crystallized and was separated by filtration. The compound melted at 185°–7°C. after twofold recrystallization from an isopropanol-methanol solvent mixture.

Analysis Calc.: C, 50.62; H, 4.55; N, 4.22; Cl, 21.35 Found: C, 50.62; H, 4.73; N, 4.06; Cl, 21.22.

EXAMPLE 2

Preparation of 2-Amino-6,7-dichlorotetralin

A solution of 108.5 g. of β-(3,4-dichlorophenyl)acrylic acid in 600 ml. of ethyl acetate was hydrogenated over 5 g. of 5 percent palladium-on-carbon for 1½ hours at 500 psi. The catalyst was separated from the hydrogenation mixture by filtration, and the filtrate evaporated to dryness leaving a residual greenish oil comprising β-(3,4-dichlorophenyl)propionic acid formed in the above hydrogenation. The greenish oil crystallized on standing, and the resulting solid melted at 86°–89°C. after recrystallization from cyclohexane.

Analysis Calc.: C, 49.35; H, 3.68; Cl, 32.37 Found: C, 49.55; H, 3.85; Cl, 32.54

Following the procedure of the Example 1, β-(3,4-dichlorophenyl)propionic acid was reduced with diborane to yield β-(3,4-dichlorphenyl)propanol which was purified by distillation. The compound distilled in the range 121°–122°C. at 0.5 mm/Hg.

Analysis Calc.: C, 52.71; H, 4.92; Cl, 34.58 Found: C, 52.88; H, 5.18; Cl, 34.32

Following the procedure of the Example 1, β-(3,4-dichlorophenyl)propanol was converted to the mesyl ester by reaction with methanesulfonyl chloride. The mesylate was in turn converted to α-(3,4-dichlorophenyl)butyronitrile by reaction with potassium cyanide in DMF. The compound distilled in the range 115°–118°C. at 0.1 mm/Hg.

Analysis Calc.: C, 56.10; H, 4.24; N, 6.54; Cl, 33.12 Found: C, 55.85; H, 4.45; N, 6.61; Cl, 33.30

Still following the procedure of Example 1, α-(3,4-dichlorophenyl)butyronitrile was hydrolyzed to the corresponding acid in 6 N HCl in aqueous dioxane. The acid was cyclized by the procedure of the Example 1 with polyphosphoric acid at 100°C. to yield 1-oxo-6,7-dichlorotetralin. The compound melted at 101°–104°C. and had the following analysis:

Analysis Calc.: C, 55.84; H, 3.75; Cl, 32.97 Found: C, 55.82; H, 3.66; Cl, 32.73

The above tetralone was reduced with sodium borohydride in ethanol by the procedure of the Example 1 to yield 1-hydroxy-6,7-dichlorotetralin. The hydroxy tetralin was dehydrated by the procedure of the Example 1 to yield 1,2-dihydro-6,7-dichloronaphthalene. The dihydronaphthalene was epoxidized by the procedure of the Example 1 with m-chloroperbenzoic acid to yield 1,2-epoxy-6,7-dichlorotetralin. The epoxy compound was rearranged by the procedure of the Example 1 with borontrifluoride in benzene solution to yield 2-oxo-6,7-dichlorotetralin. The 2-tetralone was in turn converted to 2-amino-6,7-dichlorotetralin by the action of sodium cyanoborohydride and ammonium acetate. The amine was converted to the corresponding maleate salt by the procedure of the Example 1. The maleate salt melted at 193°–195°C. after recrystallization from an ethyl acetate-isopropanol solvent mixture.

Analysis Calc.: C, 50.62; H, 4.55; N, 4.22; Cl, 21.35
Found: C, 50.39; H, 4.45; N, 4.49; Cl, 21.59

In the above example, the reduction of β-(3,4-dichlorophenyl)propionic to the corresponding propanol can be carried out using lithium aluminum hydride as the reducing agent in place of diborane without any appreciable effect on the yield of the desired alcohol.

I claim:
1. A compound of the formula

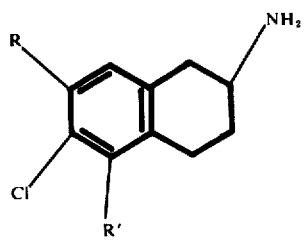

wherein one of R and R' is hydrogen and the other is chlorine.

2. A pharmaceutically acceptable acid addition salt of a compound of claim 1 formed with a non-toxic acid.

3. A compound according to claim 1, said compound being 5,6-dichloro-2-aminotetralin.

4. A compound according to claim 1, said compound being 6,7-dichloro-2-aminotetralin.

* * * * *